United States Patent
Krithivas (10) Patent No.: US 7,349,999 B2
(45) Date of Patent: Mar. 25, 2008

(54) METHOD, SYSTEM, AND PROGRAM FOR MANAGING DATA READ OPERATIONS ON NETWORK CONTROLLER WITH OFFLOADING FUNCTIONS

(75) Inventor: Ramamurthy Krithivas, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 729 days.

(21) Appl. No.: 10/747,928

(22) Filed: Dec. 29, 2003

(65) Prior Publication Data

US 2005/0187939 A1    Aug. 25, 2005

(51) Int. Cl.
G06F 13/00 (2006.01)
G06F 15/16 (2006.01)
G06F 17/30 (2006.01)

(52) U.S. Cl. .......................... 710/33; 710/34; 710/105; 710/305; 710/308; 710/50; 709/217; 709/223; 709/224; 709/225; 709/226; 709/227; 709/238

(58) Field of Classification Search ................ 710/305, 710/308, 105, 34, 50, 33; 709/223–227, 709/217, 238
See application file for complete search history.

(56) References Cited

U.S. PATENT DOCUMENTS 7,155,492 B2 * 12/2006 Obara et al. ................ 709/217
7,181,531 B2 * 2/2007 Pinkerton et al. ........... 709/238

FOREIGN PATENT DOCUMENTS

WO   WO-03/017598    2/2003
WO   WO-03/067787    8/2003

OTHER PUBLICATIONS

International Preliminary Examination Report (IPRP), Jul. 13, 2006, for International Application No. PCT/US2004/042755.
Official Letter, Feb. 24, 2006, for Taiwan Application No. 93140505.
Intel Corp., "Intel Network Connectivity: Intel PRO/1000 T IP Storage Adapter", [online], [Retrieved on Dec. 5, 2003], Retrieved from the Internet at <URL: http://www.intel.com/network/connectivity/products/iscsi/index.htm?iid=ipp_home+netcon_iscsi&>.
Intel Corp., "Intel Pro/1000 T IP Storage Adapter: Bringing Gigabit Ethernet to Network Storage", *Intel Data Sheet*, ™ 2003 Intel Corporation.

(Continued)

*Primary Examiner*—Tammara Peyton
(74) *Attorney, Agent, or Firm*—Konrad Raynes & Victor LLP (57) ABSTRACT

Provided are a method, system, and program for managing data read operations of a read command such as a read command packaged in an Internet Small Computer System Interface packet. In one embodiment, a network adapter has a microengine which obtains read target data from a cache coupled to the network adapter to respond to a read command packaged in a packet sent by an initiator over a network. If the network adapter cache does not have the target data addressed by the read command, the read command is forwarded to a target controller coupled to a storage unit to process the read command.

22 Claims, 5 Drawing Sheets

OTHER PUBLICATIONS

Intel Corp., "iSCSI: The Future of Network Storage", ™ 2002 Intel Corporation, pp. 1-7.

Krueger, M/, R. Haagens, C. Sapuntzakis, & M. Bakke, "Small Computer Systems Interface Protocol over the Internet (iSCSCI) Requirements and Design Considerations," RFC 3347, Jul. 2002, pp. 1-26.

Meth, K.Z & J. Satran, "Features of the iSCSI Protocol," *IEEE Communications Magazine*, Aug. 2003, pp. 72-75.

PCT International Search Report, May 6, 2005, for International Application No. PCT/US2004/042755.

Russinovich, M., "Inside the Cache Manager", [online] InstantDoc #3864, Oct. 1998, Retrieved from the Internet at <URL: http://www.windowsitpro.com/Articles/Print.cfm?ArticleID=3864>.

Sarkar, P., K. Vomganti, K. Meth, O. Biran, & J. Satran, "Internet Protocol Storage Area Networks", *IBM Systems Journal*, Jul. 2003.

Sarkar, P., S. Uttamchandani, K. Vorunganti, "Storage over IP: When Does Hardware Support Help?," *Proceedings of FAST '03: 2nd USENIX Conference on File amd Storage Technologies*, 2003, pp. 231-244.

Satran, J., K. Meth, C. Sapuntzakis, M. Chadalapaka, & E. Zeidner, "iSCSI", Internet Draft, Jan. 19, 2003, pp. 1-238.

Waikato Linux Users Group, "Cache", [online], Oct. 8, 2003, Retrieved from the Internet at <URL: http://www.wlug.org.nz/Cache>.

\* cited by examiner

FIG. 1

FIG. 2 iSCSI Header for SCSI Initiator Command

FIG. 3A iSCSI Header and Data Sections
of an iSCSI Target Response PDU

METHOD, SYSTEM, AND PROGRAM FOR MANAGING DATA READ OPERATIONS ON NETWORK CONTROLLER WITH OFFLOADING FUNCTIONS

BACKGROUND OF THE INVENTION

1. Field of the Invention

The present invention relates to a method, system, and program for managing data read operations including iSCSI data read operations.

2. Description of the Related Art

In a network environment, a network adapter on a host computer, such as an Ethernet controller, Fibre Channel controller, etc., will receive Input/Output (I/O) requests or responses to I/O requests initiated from the host. Often, the host computer operating system includes a device driver to communicate with the network adapter hardware to manage I/O requests to transmit and receive over a network. The host computer may also implement a protocol which packages data to be transmitted over the network into packets, each of which contains a destination address as well as a portion of the data to be transmitted. Data packets received at the network adapter are often stored in a packet buffer. A transport protocol layer can process the packets received by the network adapter, and accesses any I/O commands or data embedded in the packet.

For instance, the computer may implement the Transmission Control. Protocol (TCP) and Internet Protocol (IP) to encode and address data for transmission, and to decode and access the payload data in the TCP/IP packets received at the network adapter. IP specifies the format of packets, also called datagrams, and the addressing scheme. TCP is a higher level protocol which establishes a connection between a destination and a source. Another protocol, Remote Direct Memory Access (RDMA) establishes a higher level connection and permits, among other operations, direct placement of data at a specified memory location at the destination. Another high level protocol is the Internet Small Computer Systems Interface (iSCSI) protocol which is designed to transport SCSI commands and data over an IP network between an Initiator device such as a client, and a Target device such as a server.

The term "iSCSI" refers to the protocol defined and described by the IETF (Internet Engineering Task Force) standards body, and any variant of that protocol. One example of an iSCSI packet configuration comprises an Ethernet package encapsulating an Internet Protocol (IP) and Transmission Control Protocol (TCP) package layers, which further encapsulate an iSCSI package that includes one or more SCSI commands. In network data transmission operations, an initiator device transmits data or commands over the network to a target device. The TCP/IP package includes error correction code to determine whether the transmitted packet has changed during the transmission as the packet passes through switches and routers. Both an initiator of such an iSCSI command and the target generally can accommodate the Ethernet, TCP/IP, and iSCSI protocols when processing each part of the transmitted package. The target device, upon receiving the packet, will use the Ethernet protocol to access the TCP/IP package, the TCP/IP protocol to access the iSCSI package, and iSCSI protocol to access the SCSI commands within the iSCSI package.

A target device such as a server, storage controller or host computer, for example, often includes an iSCSI target controller or subsystem to access the SCSI commands within the iSCSI package, and to perform the SCSI commands. For example, if the SCSI command is a read command, the iSCSI target controller can read data from a target address specified in the read command from storage coupled to the target device. Data is often stored in non-volatile storage units such as disk drives and tape units which tend to be relatively slow as compared to nonvolatile memory such as random access memory (RAM). Hence, in some prior target devices, the target controller may have a cache in which a cache manager can temporarily store data in anticipation that the cached data may satisfy the next read operation in the queue.

There are a number of data caching techniques including "read-ahead" techniques in which more data than is needed to satisfy the presently pending read request, is cached in the cache. The particular caching technique used may depend upon the application being performed. For example, in a backup operation, the data read from the storage unit tends to be read in a linear fashion. Hence, data may be cached for efficient read operations by caching data from the storage unit in sequential order.

Protocol layers such as the transport layer can be performed by host software such as the network adapter device driver, an application or the operating system. However, software such as a driver for a network adapter, can utilize significant host processor resources to handle network transmission requests to the network adapter. One technique to reduce the load on the host processor is the use of a TCP/IP Offload Engine (TOE) in which TCP/IP protocol related operations are implemented in the network adapter hardware as opposed to the device driver or other host software, thereby saving the host processor from having to perform some or all of the TCP/IP protocol related operations. In addition, the offload engine can perform certain iSCSI protocol related tasks. For example, the Intel PRO/1000 T IP Storage Adapter, can perform error checking of an encapsulated iSCSI packet using the iSCSI error checking codes, before the iSCSI packets are forwarded to the iSCSI target controller for extraction and processing of the SCSI commands.

Notwithstanding, there is a continued need in the art to improve the performance of data transfer operations.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
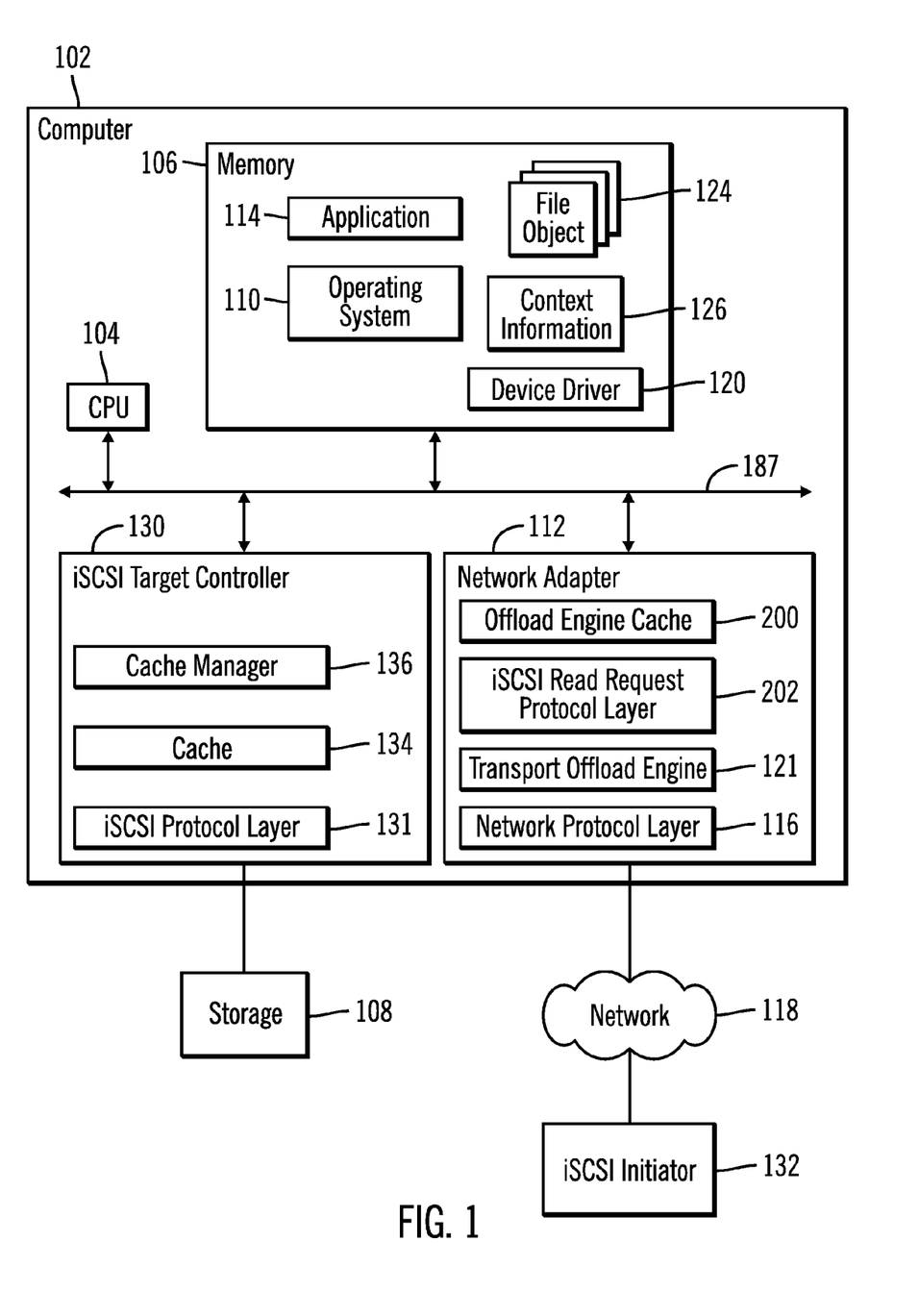
FIG. 1 illustrates one embodiment of a computing environment in which aspects of the invention are implemented.

FIG. 1 illustrates a computing environment in which aspects of the invention may be implemented. A computer 102 includes one or more central processing units (CPU) 104 (only one is shown), a memory 106, nonvolatile storage 108, an operating system 110, and a network adapter 112. An application program 114 further executes in memory 106 and is capable of transmitting and receiving packets from a remote computer. The computer 102 may comprise any computing device known in the art, such as a mainframe, server, personal computer, workstation, laptop, handheld computer, telephony device, network appliance, virtualization device, storage controller, network controller, etc. Any CPU 104 and operating system 110 known in the art may be used. Programs and data in memory 106 may be swapped into storage 108 as part of memory management operations.

The network adapter 112 includes a network protocol layer 116 to send and receive network packets to and from remote devices over a network 118. The network 118 may comprise a Local Area Network (LAN), the Internet, a Wide Area Network (WAN), Storage Area Network (SAN), etc. Embodiments may be configured to transmit data over a wireless network or connection, such as wireless LAN, Bluetooth, etc. In certain embodiments, the network adapter 112 and various protocol layers may implement the Ethernet protocol including Ethernet protocol over unshielded twisted pair cable, token ring protocol, Fibre Channel protocol, Infiniband, Serial Advanced Technology Attachment (SATA), parallel SCSI, serial attached SCSI cable, etc., or any other network communication protocol known in the art.

A device driver 120 executes in memory 106 and includes network adapter 112 specific commands to communicate with a network controller of the network adapter 112 and interface between the operating system 110, applications 114 and the network adapter 112. The network controller can implement the network protocol layer 116 and can control other protocol layers including a data link layer and a physical layer which includes hardware such as a data receiver. In an embodiment, employing the Ethernet protocol, the data transceiver could be an Ethernet transceiver.

In certain implementations, the network controller of the network adapter 112 includes a transport protocol layer as well as the network protocol layer 116. For example, the network controller of the network adapter 112 can include a TCP/IP offload engine (TOE) 121, in which transport layer operations are performed within the offload engine of the network adapter 112 hardware, as opposed to the device driver 120.

The transport protocol operations include packaging data in a TCP/IP packet with a checksum and other information and sending the packets. These sending operations are performed by an agent which may be implemented with a TOE, a network interface card or integrated circuit, a driver, TCP/IP stack, a host processor or a combination of these elements. The transport protocol operations also include receiving a TCP/IP packet from over the network and unpacking the TCP/IP packet to access the payload or data. These receiving operations are performed by an agent which, again, may be implemented with a TOE, a driver, a host processor or a combination of these elements.

The network layer 116 handles network communication and provides received TCP/IP packets to the transport protocol layer of the offload engine 121. The transport protocol layer interfaces with the device driver 120 and performs additional transport protocol layer operations, such as processing the content of messages included in the packets received at the network adapter 112 that are wrapped in a transport layer, such as TCP and/or IP, the Internet Small Computer System Interface (iSCSI), Fibre Channel SCSI, parallel SCSI transport, or any transport layer protocol known in the art. The transport offload engine 121 can unpack the payload from the received TCP/IP packet and transfer the data to the device driver 120, an application 114, the operating system 110 or other destination within the system 102.

In certain implementations, the network adapter 112 can further include an RDMA protocol layer as well as the transport protocol layer of the offload engine 121. For example, the network adapter 112 can implement an RDMA offload engine, in which RDMA layer operations are performed within the offload engines of the RDMA protocol layer implemented within the network adapter 112 hardware, as opposed to the device driver 120.

Thus, for example, an application 114 transmitting messages over an RDMA connection can transmit the message through the device driver 120 and the RDMA protocol layer of the network adapter 112. The data of the message can be sent to the transport protocol layer of the offload engine 121 to be packaged in a TCP/IP packet before transmitting it over the network 118 through the network protocol layer 116 and other protocol layers including the data link and physical protocol layers.

The memory 106 further includes file objects 124, which also may be referred to as socket objects, which include information on a connection to a remote computer over the network 118. The application 114 uses the information in the file object 124 to identify the connection. The application 114 would use the file object 124 to communicate with a remote system. The file object 124 may indicate the local port or socket that will be used to communicate with a remote system, a local network (IP) address of the computer 102 in which the application 114 executes, how much data has been sent and received by the application 114, and the remote port and network address, e.g., IP address, with which the application 114 communicates. Context information 126 comprises a data structure including information the device driver 120, operating system 110 or an application 114 maintains to manage requests sent to the network adapter 112 as described below.

In the illustrated embodiment, the CPU 104 programmed to operate by the software of memory 106 including one or more of the operating system 110, applications 114, and device drivers 120 provides a host which interacts with the network adapter 112. Accordingly, a data send and receive agent includes the transport protocol layer of the offload engine 121 and the network protocol layer 116 of the network interface 112. However, the data send and receive agent may be implemented with a TOE, a network interface card or integrated circuit, a driver, TCP/IP stack, a host processor or a combination of these elements.

The computer 102 includes an iSCSI target controller 130 which receives read and write commands over the network 118 from an initiator device 132, and in response reads data from and writes data to the storage 108. The initiator 132 may be a client computer, server or storage controller, for example. In the illustrated embodiment, the read and write commands are SCSI commands encapsulated in iSCSI packets sent over the network 118 although it is appreciated that other protocols may be used as well. The iSCSI target controller 130 includes an iSCSI protocol layer 131 and may be implemented as hardware, software, firmware of any combination thereof. For example, the target controller 130 may be implemented in hardware having a processor separate from the CPU 104. Also, the target controller 130 may be implemented in software such as in the operating system 110 or in a device driver such as a controller driver operating in the memory 106. The computer 102 includes a storage controller for the storage 108, which may be implemented with the iSCSI target controller 130 or may be implemented in separate hardware, software, firmware or any combination thereof.

Associated with the iSCSI target controller 130 is a cache 134 in which target read data may be cached by a cache manager 136 in anticipation of that cached data satisfying the next read operation from the initiator 132. The particular caching technique used may depend upon the application being performed. The cache 134 may be a part of the host memory 106 or may be a separate memory coupled to the iSCSI target controller 130. The cache manager 136 may be implemented as hardware, software, firmware of any combination thereof. For example, the cache manager 136 may be implemented in storage controller hardware and include a processor separate from the CPU 104. Also, the cache manager 136 may be implemented in the network adapter 112 or in a device driver such as a storage controller driver or a network adapter driver 120.

Figure 2:
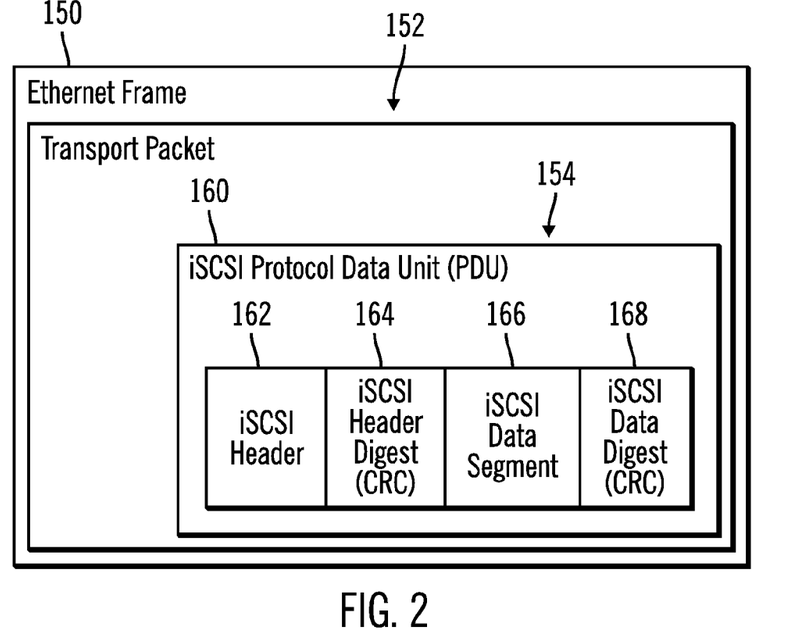
FIG. 2 illustrates a prior art packet architecture.

FIG. 2 illustrates a format of an iSCSI network packet 150 received at or transmitted by the network adapter 112. The network packet 150 is implemented in a format understood by the network protocol layer 116, such as the IP protocol. The network packet 150 may include an Ethernet frame that would include additional Ethernet components, such as a header and error checking code (not shown). A transport packet 152 is included in the network packet 150. The transport packet 152 is capable of being processed by the transport protocol layer of the offload engine 121 in accordance with the TCP protocol. The packet 152 may be processed by other layers in accordance with other protocols including Internet Small Computer System Interface (iSCSI) protocol, Fibre Channel SCSI, parallel SCSI transport, etc. The transport packet 152 includes payload data 154 as well as other transport layer fields, such as a header and an error checking code. The payload data 154 includes the underlying content being transmitted, e.g., commands, status and/or data. The driver 120, operating system 110 or an application 114 may include a device layer, such as a SCSI driver or layer to process the content of the payload data 154 and access any status, commands and/or data therein.

In the example of FIG. 2, the payload data 154 of the transport packet 152 includes one or more iSCSI Protocol Data Units (PDU) 160, each of which has an iSCSI header 162 segments; an iSCSI header digest 164 comprising a CRC code for use in error checking the iSCSI header 162 segment; an optional iSCSI data segment 166; and an optional iSCSI data digest 168 comprising a CRC code for use in error checking the iSCSI data segment 166. The iSCSI header 162 includes an opcode that indicates the type of operation being transmitted by the transmitting device. There are initiator opcodes and target opcodes.

Figure 3A:
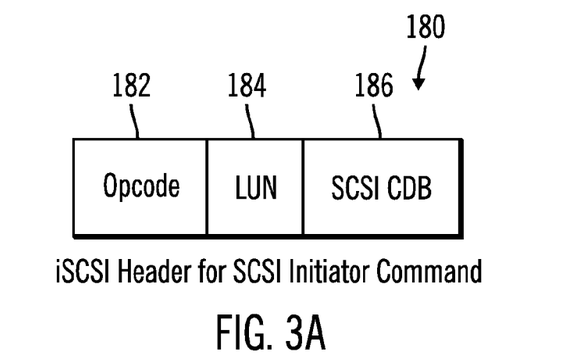
FIG. 3a illustrates a prior art iSCSI header architecture for a SCSI initiator command.

FIG. 3a illustrates certain of the information included in the iSCSI header 162 when the packet 150 is transmitted by an initiator, such as the initiator 132, and includes a SCSI command. The initiator iSCSI header 180 has an opcode field 182 for initiator opcodes and control information, a logical unit number (LUN) 184 indicating a LUN against which the SCSI command operates, and a SCSI Command Descriptor Block (CDB) 186 specifying the specific SCSI command that is to be processed by the target into a SCSI command which is sent to the storage 108.

The network adapter 112 can unpack the iSCSI Protocol Data unit 160 from the packet sent by the initiator 132. If the packet passes the iSCSI check of the iSCSI CRC codes, the iSCSI Protocol Data unit 160 is forwarded to the iSCSI protocol layer 131 of the iSCSI target controller 130. In the illustrated embodiment, the network adapter 112 and the iSCSI target controller 130 are coupled to each other by a system bus 187 over which data is passed. The iSCSI protocol layer 131 translates the iSCSI commands and iSCSI data sequences received from the network adapter 112 to SCSI commands and SCSI data sequences. In addition the iSCSI protocol layer 131 forwards the SCSI commands to the storage 108 to perform the read or write operations requested by the initiator 132.

Figure 3B:
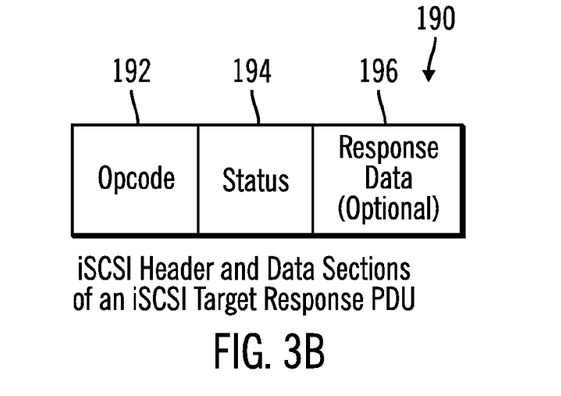
FIG. 3b illustrates a prior art iSCSI header and data section architecture for a SCSI target response.

In response to an iSCSI packet from the initiator 132, the iSCSI protocol layer 131 of the iSCSI target controller 130 also prepares response data and status information which are packaged into iSCSI packets to be sent by the sending agent to the initiator 132. FIG. 3b illustrates certain of the information included in the iSCSI header 162 when the packet 150 is transmitted by a target device, such as the iSCSI target controller 130, in response to a request by the initiator, such as the initiator 132 The target iSCSI header 190 includes, among other things, an opcode field 192 for target opcodes and control information; a status field 194 indicating the SCSI status of the received command, e.g., good, check condition, busy, etc.; and response data 196, such as read target data to return in response to a SCSI read request. The target iSCSI header 190 including the target read data requested by the initiator 132 are transmitted by the iSCSI target controller 130 over the system bus 187 to the network adapter 112 to be packaged in a suitable packet for transmission back to the initiator 132 over the network 118.

Figure 4:
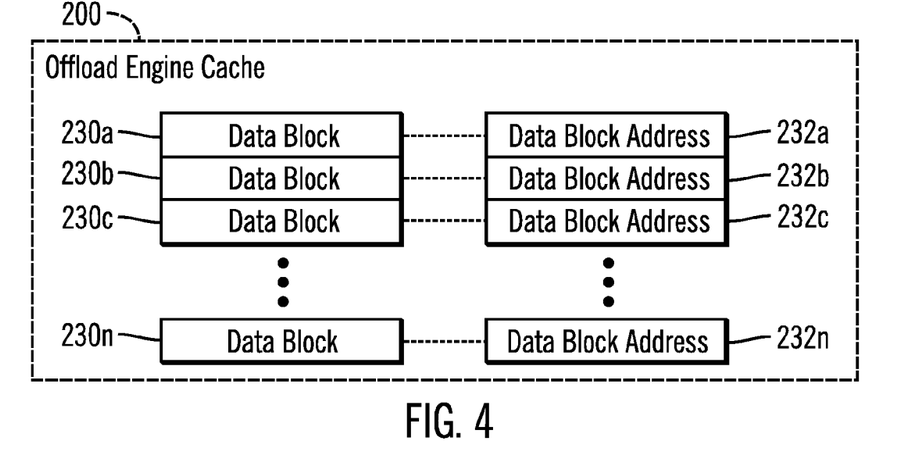
FIG. 4 illustrates one embodiment of a cache for use with a network adapter having a microengine for performing iSCSI related tasks in accordance with aspects of the invention.

In accordance with one aspect of the illustrated embodiments, the network adapter 112 has associated with it, a cache 200, an example of which is illustrated in FIG. 4. The cache 200 can be located as a physical part of the network adapter 112 or may be coupled to the network adapter 112 through a suitable memory controller, for example. A cache manager, such as the cache manager 136 of the iSCSI target controller 130, can temporarily store target read data in the cache 200 of the network adapter 112 in anticipation of that cached data satisfying the next read operation in the queue from the initiator 132. In another aspect, the network adapter 112 includes a storage command protocol layer, which, in the illustrated embodiment is at least a partial iSCSI protocol layer 202. The iSCSI protocol layer 202 can process SCSI commands such as read commands encapsulated in an iSCSI packet, and respond to the initiator 132 with read data from the network adapter cache 200, if the data cached in the cache 200 satisfies the read request from the initiator 132. As a consequence, the transmission of iSCSI commands over the network bus 187 to the iSCSI target controller 130 can be avoided, in some circumstances, to improve target efficiency. In the illustrated embodiment, the iSCSI protocol layer 202 and the transport protocol layer are implemented using a micro or offload engine such as the TOE 121.

Figure 5:
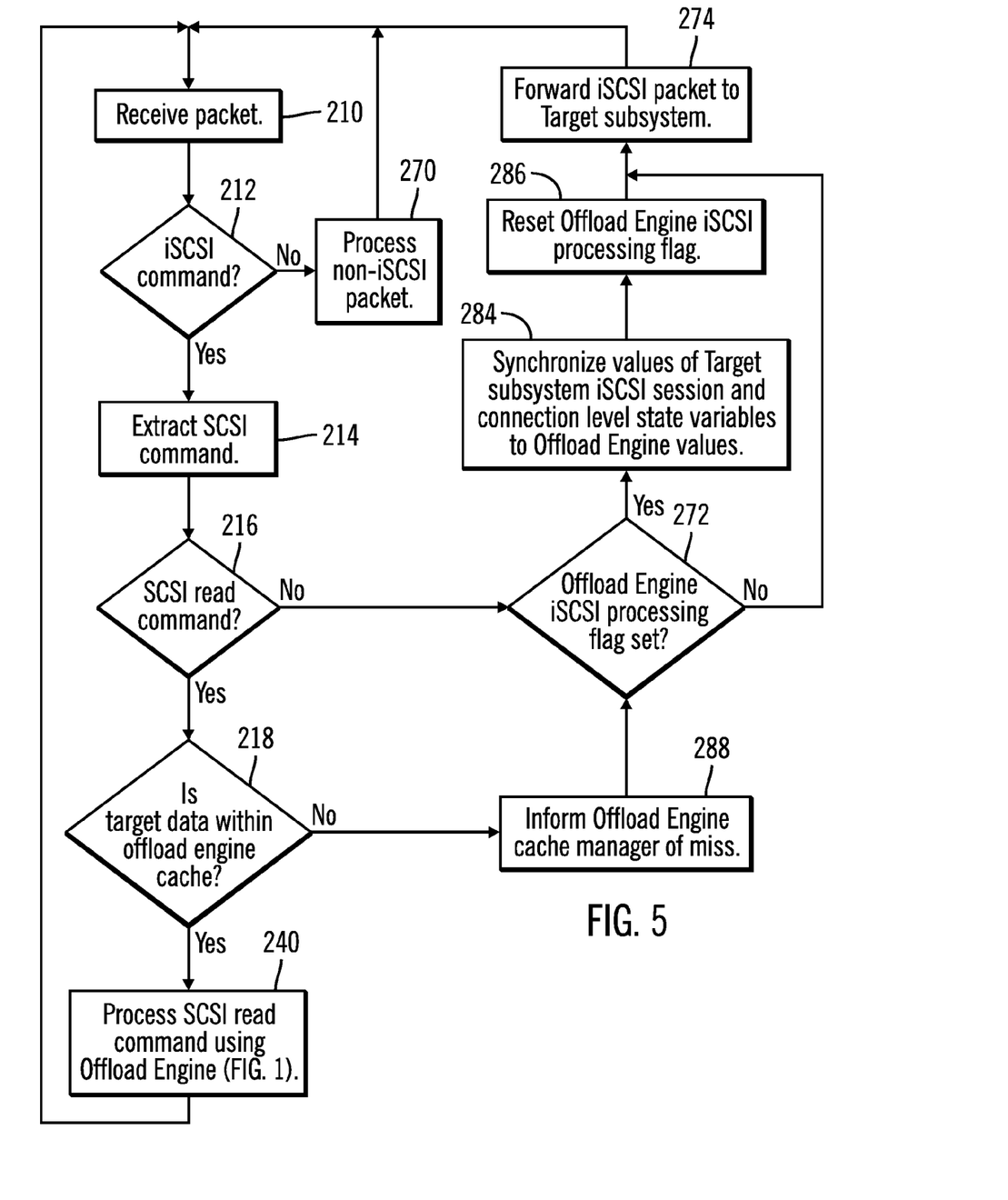
FIGS. 5 and 6 illustrate one embodiment of operations performed to process SCSI read commands using a network adapter microengine in accordance with aspects of the invention.
Figure 6:
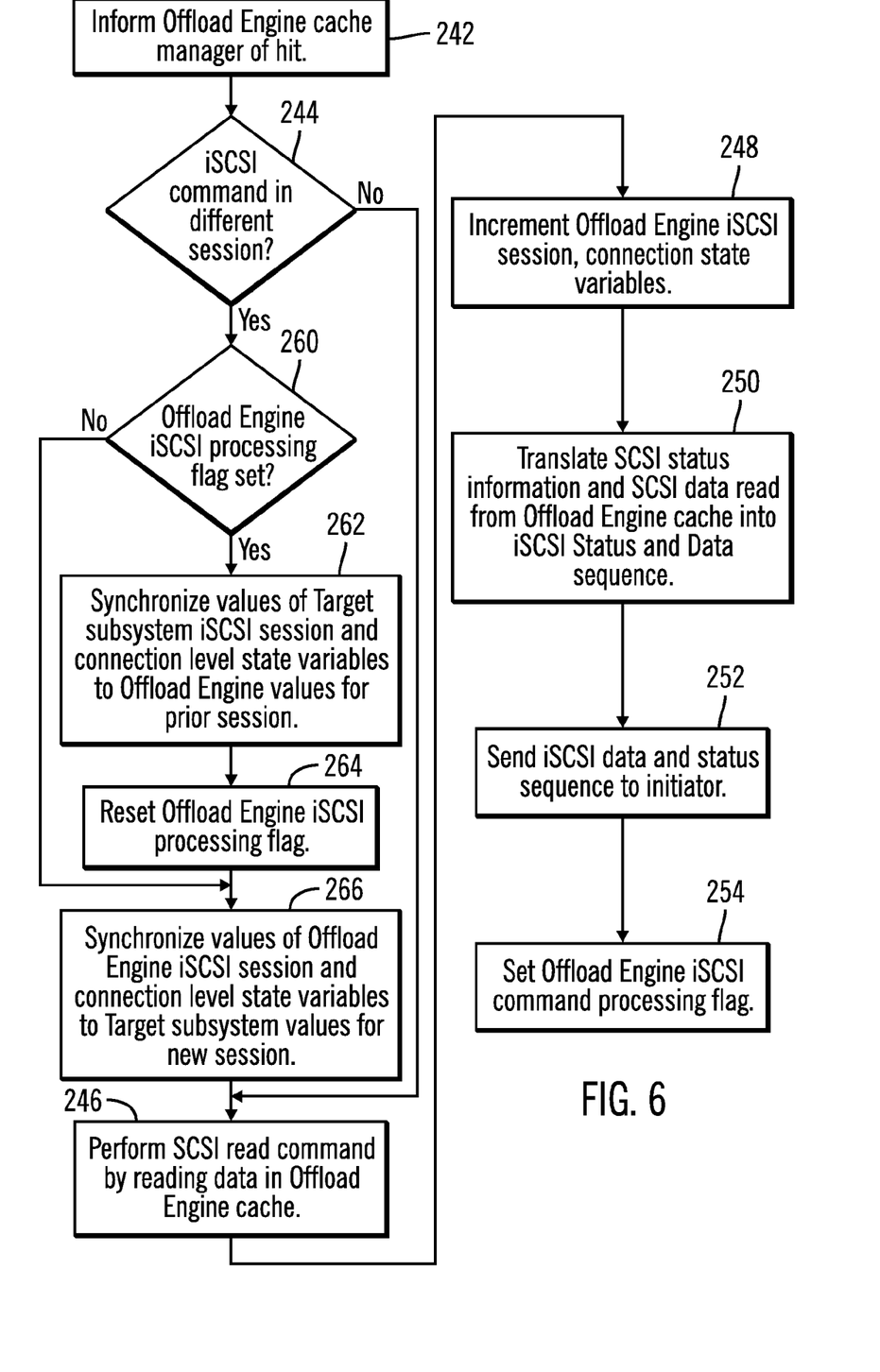

FIGS. 5 and 6 show an example of logic for responding to storage commands in a network adapter such as the network adapter 112. In the illustrated embodiment, the network adapter 112 receives (block 210) from the network 118 a packet and processes it in accordance with the network protocol layer 116, the transport protocol layer of the offload engine 121 and the iSCSI read command protocol layer 202 as described below. If it is determined (block 212) that the received packet includes an iSCSI Protocol Data Unit (PDU) 154, the SCSI command is extracted (block 214) by the transport layer of the offload engine 121 or the iSCSI protocol layer 202. However, if the Protocol Data Unit does not pass the iSCSI error check using the iSCSI error checking codes, the packet is discarded and a retransmit request is made.

A determination (block 216) is also made by the iSCSI protocol layer 202 as to whether the extracted SCSI command is a read command. If so, a determination (block 218) is made by the iSCSI protocol layer 202 as to whether the target data requested to be read by the extracted SCSI read command is already waiting in the cache 200 of the network adapter 112. In the illustrated embodiment, the cache 200 for the offload engine of the network adapter 112, includes in addition to read data blocks 230a, 230b . . . 230n (FIG. 4) cached in the memory 202 by the cache manager 136, the target addresses 232a, 232b . . . 232n of the storage 108 at which each data block 230a, 230b . . . 230n, respectively was stored in the storage 108. By comparing the target address of the read command extracted from the received protocol data unit, to the target addresses 232a, 232b . . . 232n stored in the offload engine cache 200, a determination (block 218) may be made as to whether the target data of the read command is within the cache 200. Thus, if the read command target address matches the target address of one of the blocks 230a, 230b . . . 230n of target data stored in the cache, the data block of blocks 230a, 230b . . . 230n corresponding to the matching address is the target data requested by the extracted SCSI read command.

If so, the SCSI read command may be processed (block 240) using the offload engine of the network adapter 112 rather than the iSCSI target controller 130. FIG. 6 shows an example of operations of the iSCSI protocol layer 202 including the network adapter 112 offload engine in processing the extracted read command. In the illustrated embodiment, the iSCSI protocol layer 202 of the network adapter 112 informs (block 242) the cache manager 136 that a "hit" was made, that is, that the target data of the extracted read command was found in the cache 200. The cache manager 136 may use this positive feedback to assist in the operation of the read ahead technique being used to transfer data to the cache 200 in anticipation of upcoming read operations. As previously mentioned, the particular read ahead technique utilized by the cache manager managing the cache 200 may vary, depending upon the particular application.

A determination (block 244) is made as to whether the present read command is associated with a different iSCSI session In accordance with the iSCSI protocol, the iSCSI target controller 130 includes a state machine which can maintain a plurality of sessions with one or more initiators and can maintain a plurality of connections within each session. The iSCSI protocol layer 131 of the iSCSI target controller 130 maintains the state values of the different iSCSI connections and sessions. In accordance with another aspect of the illustrated embodiment, the iSCSI protocol layer 202 of the network adapter 112 similarly can maintain appropriate state values of an iSCSI connection and session when responding to a read request. As explained in greater detail below, the iSCSI protocol layer 202 of the network adapter 112 and the iSCSI protocol layer 131 of the iSCSI target controller 130 can synchronize their respective session and connection state variables as appropriate.

If it is determined (block 244) that the present read command is not associated with a different iSCSI session, the iSCSI protocol layer 202 of the network adapter 112 can respond (block 246) to the extracted SCSI read command by reading the target data from the offload engine cache 200. In addition, the iSCSI protocol layer 202 increments (block 248) the appropriate values of the iSCSI connection and session state variables when responding to the read request. For example, a unique sequence number may be assigned each request which is provided by an initiator in a session. This sequence number may be maintained by the iSCSI protocol layer 202 of the network adapter 112 and incremented for each read request handled by the iSCSI protocol layer 202 of the network adapter 112.

In addition, the iSCSI protocol layer 202 of the network adapter 112 translates (block 250) status information and the target data read from the offload engine cache 200 into one or more iSCSI Data and Status sequences. Each iSCSI Data and Status sequence is encapsulated into an iSCSI protocol data unit which is encapsulated in a transport packet etc. by the iSCSI protocol layer 202, the transport protocol layer of the offload engine 121 and by the network protocol layer 116, and sent (block 252) to the requesting initiator in response to the read request. The iSCSI protocol layer 202 also maintains a flag which is set (block 254) when the last packet received contains a read request which was responded to by the iSCSI protocol layer 202 of the network adapter.

As shown in FIG. 5, the processing of the packets by the network adapter 112 continues in this manner so long as the next packet received (block 210), contains a SCSI read request (block 216), the target data of the read request can be found (block 218) in the offload engine cache 200 and the read command is part of the same session (block 244, FIG. 6). However, if the next packet received contains a read request which relates to a different session (block 244), a determination (block 260) is made as to whether the offload engine iSCSI process flag has been set, that is, whether the last packet processed was a packet containing a read request which was processed by the iSCSI protocol layer 202. If so, the session and connection state variable values of the iSCSI protocol layer 131 of the iSCSI target controller 130 are synchronized (block 262) to those of the iSCSI protocol layer 202 of the network adapter 112 for the prior session.

The offload engine iSCSI command processing flag is reset (block 264) and the session and connection state variable values of the iSCSI protocol layer 202 of the network adapter 112 are synchronized (block 266) to those of the iSCSI protocol layer 131 of the iSCSI target controller 130 for the next session. The read request is then processed (blocks 246-254) as set forth above.

If the next packet (block 210, FIG. 5) does not contain an iSCSI protocol data unit (block 212), the packet is processed (block 270) as a nor-iSCSI packet by the transport protocol layer of the offload engine 121. If the next packet (block 210) does contain an iSCSI protocol data unit (block 212) but the encapsulated SCSI command is not a read command (block 216), a determination (block 272) is made as to whether the offload engine iSCSI process flag has been set, that is, whether the last packet processed was a packet containing a read request which was processed by the iSCSI protocol layer 202. If not, the iSCSI protocol data unit is forwarded (block 274) over the system bus 187 to the iSCSI protocol layer 131 of the iSCSI target controller 130 to be processed. If the offload engine iSCSI process flag has been set, that is, it is determined (block 272) that the last packet processed was a packet containing a read request which was processed by the iSCSI protocol layer 202, the session and connection state variable values of the iSCSI protocol layer 131 of the iSCSI target controller 130 are synchronized (block 284) to those of the iSCSI protocol layer 202 of the network adapter 112 for the prior session. The offload engine iSCSI command processing flag is reset (block 286) and the iSCSI protocol data unit is forwarded (block 274) to the iSCSI protocol layer 131 of the iSCSI target controller 130 to be processed.

If the next packet (block 210) does contain an iSCSI protocol data unit (block 212) and the encapsulated SCSI command is a read command (block 216), but it is determined (block 218) that the target data requested to be read by the extracted SCSI read command is not in the cache 200 of the network adapter 112, the cache manager 136 is informed (block 288) of the "miss" that is, that the target data of the extracted read command was not found in the cache 200. The cache manager 136 may use this negative feedback to assist in determining the appropriate data to read ahead and transfer to the cache 200 in anticipation of upcoming read operations.

Again, a determination (block 272) is made as to whether the offload engine iSCSI process flag has been set, that is, whether the prior packet processed was a packet containing a read request which was processed by the iSCSI protocol layer 202. If not, the iSCSI protocol data unit is forwarded (block 274) to the iSCSI protocol layer 131 of the iSCSI target controller 130 to be processed. If the offload engine iSCSI process flag has been set, that is, it is determined (block 272) that the prior packet processed was a packet containing a read request which was processed by the iSCSI protocol layer 202, the session and connection state variable values of the iSCSI protocol layer 131 of the iSCSI target controller 130 are synchronized (block 284) to those of the iSCSI protocol layer 202 of the network adapter 112 for the prior session. The offload engine iSCSI command processing flag is reset (block 286) and the iSCSI protocol data unit is forwarded (block 274) to the iSCSI protocol layer 131 of the iSCSI target controller 130 to be processed.

ADDITIONAL EMBODIMENT DETAILS

The described techniques for managing data read operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and nonvolatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, a transport protocol layer of the offload engine 121 and at least partial iSCSI protocol layer 202 were implemented in the network adapter 112 hardware. In alternative implementations, at least a portion of the protocol layers may be implemented in the device driver 120, host memory 106, iSCSI target controller 130 or CPU 104.

In the described embodiments, various protocol layers and operations of those protocol layers were described. The operations of each of the various protocol layers may be implemented in hardware, firmware, drivers, operating systems, applications or other software, in whole or in part, alone or in various combinations thereof.

In the described embodiments, the packets are transmitted from a remote computer over a network. In alternative embodiments, the transmitted and received packets processed by the protocol layers or device driver may be transmitted to a separate process executing in the same computer in which the device driver and protocol layers execute. In such embodiments, the network adapter is not used as the packets are passed between processes within the same computer and/or operating system.

In certain implementations, the device driver and network adapter embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, the network adapter embodiments may be included in a system that does not include a storage controller, such as certain hubs and switches.

In certain implementations, the device driver and network adapter embodiments may be implemented in a computer system including a video controller to render information to display on a monitor coupled to the computer system including the device driver and network adapter, such as a computer system comprising a desktop, workstation, server, mainframe, laptop, handheld computer, etc. Alternatively, the network adapter and device driver embodiments may be implemented in a computing device that does not include a video controller, such as a switch, router, etc.

In certain implementations, the network adapter may be configured to transmit data across a cable connected to a port on the network adapter. Alternatively, the network adapter embodiments may be configured to transmit data over a wireless network or connection, such as wireless LAN, Bluetooth, etc.

The illustrated logic of FIGS. 5-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

FIG. 4 illustrates information used to manage read operations. In alternative implementation, these data structures may include additional or different information than illustrated in the figures.

Figure 7:
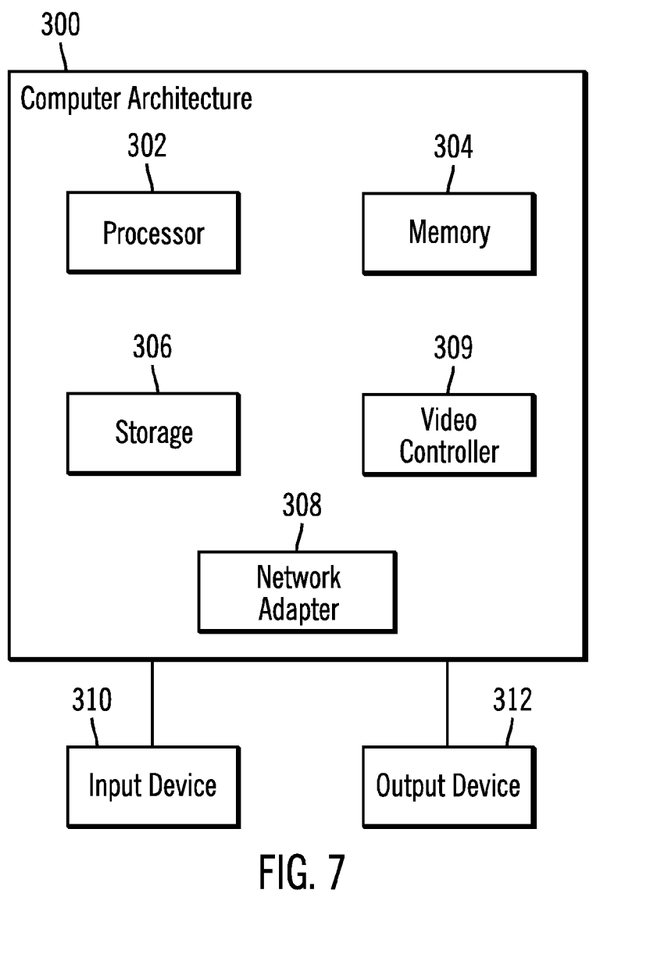
FIG. 7 illustrates an architecture that may be used with the described embodiments.

FIG. 7 illustrates one implementation of a computer architecture 300 of the network components, such as the hosts and storage devices shown in FIG. 1. The architecture 300 may include a processor 302 (e.g., a microprocessor), a memory 304 (e.g., a volatile memory device), and storage 306 (e.g., a nonvolatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network adapter 308 to enable communication with a network, such as an Ethernet, a Fibre Channel Arbitrated Loop, etc. Further, the architecture may, in certain embodiments, include a video controller 309 to render information on a display monitor, where the video controller 309 may be implemented on a video card or integrated on integrated circuit components mounted on the motherboard. As discussed, certain of the network devices may have multiple network cards or controllers. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The network adapter 308 may be implemented on a network card, such as a Peripheral Component Interconnect (PCI) card or some other I/O card, or on integrated circuit components mounted on the motherboard.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for use with a network and an initiator coupled to the network, comprising:
   at least one memory which includes an operating system;
   a processor coupled to the memory;
   a bus;
   target storage adapted to store target data at target addresses of said data storage;
   a target controller coupled to the bus, for managing Input/Output (I/O) access to the target storage, including processing read commands addressing target data having target addresses within said target storage;
   a device driver executable by the processor in the memory; and
   a network controller coupled to the bus and having an offload engine and a cache adapted to store target data from at least one target address of said target storage, said network controller being adapted to:
   receive from the initiator, a packet containing a read command which addresses target data having a target address within said target storage; and
   compare the target address of the read command to a target address of the target data in the cache for the network controller engine;
   wherein said offload engine is adapted to process said read command if target data stored in the cache was obtained from a target address which corresponds to the read command target address, said processing including sending target data stored in the cache through the network to the initiator and wherein said read command is processed by said network controller instead of said target controller.

2. The system of claim 1 wherein the network controller is further adapted to forward the read command over the bus to the target controller to be processed by the target controller if the target data stored in the cache was obtained from a target address which does not correspond to the read command target address.

3. The system of claim 1 wherein said read command is a Small Computer System Interface command and said packet includes an Internet Small Computer System Interface package packaging said Small Computer System Interface command.

4. The system of claim 3 wherein said packet includes an Ethernet packet, Internet Protocol and Transmission Control Protocol package layers encapsulated in the Ethernet packet, and wherein the Internet Small Computer System Interface package is encapsulated in the Internet Protocol and Transmission Control Protocol package layers.

5. The system of claim 4 wherein the network controller is further adapted to forward the read command over the bus to the target controller for processing by the target controller if the target data stored in the cache was obtained from a target address which does not correspond to the read command target address and wherein the target controller is adapted to process the read command in accordance with an Internet Small Computer System Interface layer.

6. The system of claim 5 wherein the offload engine of the network controller is adapted to process the read command in accordance with an Internet Small Computer System Interface layer including translating said target data to an Internet Small Computer System Interface data sequence and sending the sequence to the initiator over the network.

7. The system of claim 6 wherein the network controller cache is further adapted to store the target addresses within said target storage from which the target data stored in said cache was obtained.

8. The system of claim 6 wherein said target controller includes a state machine having Internet Small Computer System Interface session state variables, and said network controller includes a state machine having at least one Internet Small Computer System Interface session state variable, and wherein the network controller is further adapted to synchronize a value of said network controller state variable to a value of said target controller state variable in connection with offload engine translating said target data to be sent to said initiator into an Internet Small Computer System Interface data sequence.

9. The system of claim 8 wherein the network controller is further adapted to:
   receive from said initiator, a second packet containing a second read command which addresses target data having a target address within said target storage;

compare the target address of the second read command to a target address of the target data in the cache for the network adapter engine; and forward said read command over said bus to said target controller if the target data stored in the cache was obtained from target addresses which do not correspond to the read command target address; and wherein the target controller is adapted to process said read command, translate target data from said storage to an Internet Small Computer System Interface data sequence and send the sequence to the initiator over the network.

10. The system of claim 9 wherein the target controller is further adapted to synchronize a value of said target controller state variables to a value of said network adapter state variable in connection with said target controller processing said second read command.

11. The system of claim 1 for use with an unshielded twisted pair cable, said system further comprising an Ethernet data transceiver coupled to said network controller and said cable and adapted to transmit and receive data over said cable.

12. The system of claim 1 further comprising a video controller coupled to said processor.

13. A device for use with a target controller, a bus, a target storage adapted to store target data, a network, an initiator coupled to the network, and a target controller for managing Input/Output (I/O) access to the target storage, including processing read commands addressing target data having target addresses within said target storage, comprising:

a network controller having an offload engine and a cache adapted to store target data from at least one target address of said target storage, said network controller being adapted to:

receive from the initiator, a packet containing a read command which addresses target data having a target address within said target storage; and compare the target address of the read command to a target address of the target data in the cache for the network controller engine;

wherein said offload engine is adapted to process said read command if target data stored in the cache was obtained from a target address which corresponds to the read command target address, said processing including sending target data stored in the cache through the network to the initiator and wherein said read command is processed by said network controller instead of said target controller.

14. The device of claim 13 wherein the network controller is further adapted to forward the read command over the bus to the target controller to be processed by the target controller if the target data stored in the cache was obtained from a target address which does not correspond to the read command target address.

15. The device of claim 13 wherein said read command is a Small Computer System Interface command and said packet includes an Internet Small Computer Device Interface package packaging said Small Computer System Interface command.

16. The device of claim 15 wherein said packet includes an Ethernet packet, and Internet Protocol and Transmission Control Protocol package layers encapsulated in the Ethernet packet, and wherein the Internet Small Computer System Interface package is encapsulated in the Internet Protocol and Transmission Control Protocol package layers.

17. The device of claim 16 wherein the network controller is further adapted to forward the read command over the bus to the target controller for processing by the target controller if the target data stored in the cache was obtained from a target address which does not correspond to the read command target address and wherein the target controller is adapted to process the read command in accordance with an Internet Small Computer System Interface layer.

18. The device of claim 17 wherein the offload engine of the network controller is adapted to process the read command in accordance with an Internet Small Computer System Interface layer including translating said target data to an Internet Small Computer System Interface data sequence and sending the sequence to the initiator over the network.

19. The device of claim 18 wherein the network controller cache is further adapted to store the target addresses within said target storage from which the target data stored in said cache was obtained.

20. The device of claim 18 wherein said target controller includes a state machine having Internet Small Computer System Interface session state variables, and said network controller includes a state machine having at least one Internet Small Computer System Interface session state variable, and wherein the storage controller is further adapted to synchronize a value of said network controller state variable to a value of said target controller state variable in connection with offload engine translating said target data to be sent to said initiator into an Internet Small Computer System Interface data sequence.

21. The device of claim 20 wherein the network controller is further adapted to:

receive from said initiator, a second packet containing a second read command which addresses target data having a target address within said target storage;

compare the target address of the second read command to a target address of the target data in the cache for the network adapter engine; and forward said read command over said bus to said target controller if the target data stored in the cache was obtained from target addresses which do not correspond to the read command target address; and wherein the target controller is adapted to process said read command, translate target data from said storage to an Internet Small Computer System Interface data sequence and send the sequence to the initiator over the network.

22. The device of claim 21 wherein the target controller is further adapted to synchronize a value of said target controller state variables to a value of said network adapter state variable in connection with said target controller processing said second read command.

* * * * *